(12) United States Patent
Wu

(10) Patent No.: US 7,307,984 B2
(45) Date of Patent: Dec. 11, 2007

(54) METHOD FOR RAPIDLY DISPATCHING H.323 PACKETS

(75) Inventor: Chien-Sheng Wu, Taipei (TW)

(73) Assignee: Institute for Information Industry, Taipei (TW)

( * ) Notice: Subject to any disclaimer, the term of this patent is extended or adjusted under 35 U.S.C. 154(b) by 797 days.

(21) Appl. No.: 10/839,134

(22) Filed: May 6, 2004

(65) Prior Publication Data
US 2005/0074004 A1    Apr. 7, 2005

(30) Foreign Application Priority Data
Oct. 6, 2003    (TW) ............................. 92127660 A

(51) Int. Cl.
*H04L 12/66* (2006.01)
(52) U.S. Cl. ...................... 370/352; 370/392
(58) Field of Classification Search ............ None
See application file for complete search history.

(56) References Cited

U.S. PATENT DOCUMENTS 6,980,526 B2 * 12/2005 Jang et al. .............. 370/260

2002/0085561 A1 * 7/2002 Choi et al. .............. 370/392
2004/0028035 A1 * 2/2004 Read .......................... 370/352

* cited by examiner

*Primary Examiner*—Chau Nguyen
*Assistant Examiner*—Dargaye H Churnet
(74) *Attorney, Agent, or Firm*—Connolly Bove Lodge and Hutz

(57) ABSTRACT

A method of rapidly dispatching H.323 packets is disclosed, which is executed after an H.225 protocol connection and before a physical connection of audio/video multimedia data delivery are established between the caller and the callee, and uses Network Address & Port Translation (NAPT) to provide a changed connection port number to H.245 packets between a caller and a callee. A unique connection port number selected by the NAPT is applied to change an original connection port number for packets controlled by the H.245 protocol, thereby providing the changed connection port number as a memory index for add or delete operation and further increasing H.323 packet dispatching rate by directly and quickly comparing memory address through the memory index when searching.

11 Claims, 4 Drawing Sheets

US 7,307,984 B2

METHOD FOR RAPIDLY DISPATCHING H.323 PACKETS

BACKGROUND OF THE INVENTION

1. Field of the Invention

The present invention relates to a packet dispatching method and, more particularly, to a method for rapidly dispatching H.323 packets.

2. Description of Related Art

Currently, a hardware chip or a system on chip (SoC) generally has a plurality of chips, functional blocks, or models, each having a specific function, so as to gain pipeline or parallel processing effect.

FIG. 1 shows a schematic diagram of the essentially functional blocks of a Network Address & Port Translation system on chip (NAPT SoC). In FIG. 1, the NAPT SoC consists of a dispatcher 11, a basic NAPT module 12, at least one NAPT Application Layer Gateway module (ALG module) 13 and a forwarding module 14, etc.

The dispatcher 11 receives a packet and determines what kind of the packet is. Accordingly, the packet is dispatched to the basic unit 12 or the ALG unit 13 for further processing. The basic NAPT module 12 is a general NAPT module which translates network address or port number. The ALG module 13 processes the content of specific application data in the Application Layer, such as H.323, File Transfer protocol (FTP), Session Initial Protocol (SIP), and so on. Therefore, there are plural ALG units 13 in general. The forwarding module 14 forwards packets after processed by the basic unit 12 or the ALG unit 13.

FIG. 2 shows a schematic diagram of packet dispatch from the dispatcher 11. As show in FIG. 2, the dispatcher 11 has a look up table 111 with a protocol field 1111, a port number field 1112 and a corresponding process field 1113 for the dispatcher 11 to complete packet dispatching in accordance with the look up table 111. For example, when the dispatcher 11 receives a packet with TCP protocol and port number 1720, the packet is known as an H.323 control message packet in accordance with the look up table 111, and thus the dispatcher 11 sends the packet to an H.323 ALG module 131 to process. Alternately, when the packet applies TCP protocol and has port number 21, the packet is known as an FTP control message packet in accordance with the look up table 111, and thus the dispatcher 11 sends the packet to the FTP ALG module 132 to process. Alternately, when the packet applies TCP or UDP protocol and has port number 5060, the packet is known as an SIP control message packet in accordance with the look up table 111, and thus the dispatcher 11 sends the packet to the SIP ALG module 133 to process.

However, H.323 has many sub-protocols such as Q.931/call signaling (H.225) and control signaling (H.245). Therefore, the dispatcher at front end requires dynamic add and delete functions for associated H.323 information. Namely, the look up table 111 initially established in the dispatcher records only a port number 1720 used by H.225. However, a caller or a callee in H.245 provides dynamic port number (not fixed). For example, an H.245 connection port number provided by the callee can be 1092, whereas the caller may provide port numbers 2002, 2003 to proceed multimedia data transmission for Real-Time Protocol (RTP)/Real-Time Control Protocol (RTCP) after H.245 connection is complete and the callee may provide port numbers 1092, 1093 to proceed RTP/RTCP multimedia data transmission. However, the cited port numbers 2002, 2003, 1092, 1093 are not recorded in the table 111 initially established. Accordingly, the dispatcher 11 requires dynamic add and delete functions for real-time recording new port number(s) used in H.323, so as to determine a packet type currently received according to the new port number(s). An example of using the NAPT to establish an H.323 connection is described as follows.

FIG. 3 shows a chart of message flows between end users E1 and E2 through the NAPT N1 under H.323 protocol. As shown in FIG. 3, the end user E1 applies a virtual network address A1 and a port number P0 in order to establish an H.225 connection to a port number 1720 of the end user E2. The translator N1 changes the virtual network address A1 into a public network address A0 belong to the translator N1 and the port number P0 into a port number P10 selected by the translator N1. The cited data changed is stored in a look up table 31 and subsequently a connection message is sent to the end user E2.

The end user E2 applies a virtual network address A2 and the port number 1720 to respond the connection message to the port number P10 belong to the translator N1. After the translator N1 receives a packet with the port number 1720, the packet is sent to the H.323 ALG module to process due to the port number 1720. The packet after being processed is sent to the end user E1 with the address A1 and port number P0, thereby completing the H.225 connection. Next, the end user E2 separately issues 'Alerting' and 'Connect' control message packets to the end user E1. The 'Connect' control message packet dynamically provides data including its address A2 and port number P100, to inform the end user E1 of H.245 connection data to be proceeded later. Packets to be delivered by the end user E2 are forwarded to the end user E1 through the translator N1. Next, the end user E1 provides the port number P1 to proceed H.245 connection to the port number P100 of the end user E2. The translator N1 determines the internal basic NAPT module or H.323 ALG module (not shown) to process a received packet sent from the end user E1, in accordance with the packet's destination port number. However, the packet's port number P100 (e.g., 1920) is not recorded in the look up table, so that the translator N1 first needs time to dynamically add or delete the port number P100, then translates the packet's address and port into its network address A0 and a selected port number P11, and finally sends the packet translated to the end user E2. Subsequently, H.245 control messages are exchanged between the end users E1 and E2 through the translator N1, thereby establishing a connection for delivering multimedia data such as RTP/RTCP and the like.

As cited, when H.225 and H.245 connections are establishing, the dispatcher 11 of the translator N1 dispatches packets to other functional block(s) for further processing in accordance with its built-in look up table. At this point, however, only port number 1720 for establishing an H.225 connection is recorded in the look up table while port number for establishing an H.245 connection is not pre-recorded in the look up table. Furthermore, the translator N1 determines required connection port number when a substantial outward connection occurs (at H.245 connection setup or a physical connection for delivering multimedia data such as RTP/RTCP and the like). Thus, the dispatcher of the translator N1 wastes much time on packet dispatching when processing H.323 packets.

A typical dispatcher mostly uses a linear-based or hash-based table to determine if a packet to be processed belongs to the H.323 ALG module. If a linear way is applied for the search, it consumes a lot of time and requires maintaining blank fields of the table for add or delete data anytime. If a hash way is applied for the search, it requires a lot of memory space to store a hash table, which may not be available for an environment with limited hardware or SoC. In addition, a content addressable memory (CAM) can be used to speed up required searching, whereas this costs much and is not practical.

Therefore, it is desirable to provide an improved method for the cited front-end dispatcher to mitigate and/or obviate the aforementioned problems, thereby avoiding slow determination caused by supporting H.323 processes and further slowing down entire performance.

SUMMARY OF THE INVENTION

An object of the present invention is to provide a method for rapidly dispatching H.323 packets, which can increase the determination speed of a front-end dispatcher.

Another object of the present invention is to provide a method for rapidly dispatching H.323 packets, which can easily maintain a look up table and simplify hardware implementation.

According to a feature of the present invention, a method for rapidly dispatching H.323 packets is provided and implemented in a network address and port translation (NAPT) with a first network address. The method includes the steps: an H.225 message packet receiving step, which uses the NAPT to receive an H.225 connect message packet sent by a second termination, the H.225 message packet including a data content having a first connection port number for an H.245 connection; a connection port number changing step, which uses the NAPT to select a second connection port number to replace the first connection port number of the H.225 connect message packet and thus generate a changed message packet for a first termination; an H.245 connection packet receiving step, which uses the NAPT to receive an H.245 connection packet sent by the first termination, the H.245 connection packet including a source content having both a third connection port number and a second network address and a destination content having both the second connection port number and a third network address; a connection port number changing step, which uses the NAPT to change the third connection port number by means of the second connection port number for generating a changed H.245 connection packet, record the second and third connection port numbers for producing an index relation, and send the changed H.245 connection packet to the second termination; an H.245 connection responding step, which uses the second termination to send a response packet to the second connection port number of the NAPT in accordance with the changed H.245 connection packet, the response packet including a source content having both the third network address and the first connection port number; a packet translation forwarding step, which uses the NAPT to forward the response packet to the first termination based on the index relation and translate first the first connection port number in the source content of the response packet into the second connection port number, then the first network address and the first connection port number into the first termination's second network address and the third connection port number and final the response packet into the third connection port number of the first termination; and a connection message exchanging step, which interchanges packets between the first termination and the second termination through the NAPT and second connection port number.

According to another feature of the present invention, a method for rapidly dispatching H.323 packets is provided and implemented in a network address and port translation (NAPT) with a first network address. The method includes the steps: an H.225 message packet receiving step, which uses the NAPT to receive an H.225 connect message packet sent by a second termination, the H.225 connect message packet including a data content having a first connection port number for an H.245 connection; and a connection port changing step, which uses the NAPT to select a second connection port number to replace the first connection port number of the H.225 message packet and thus generate a changed message packet for a first termination, in order to translate corresponding packet address and connection port number through the second connection port number and the NAPT in the following H.245 connection protocol and message interchange, thereby rapidly dispatching H.323 packets.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
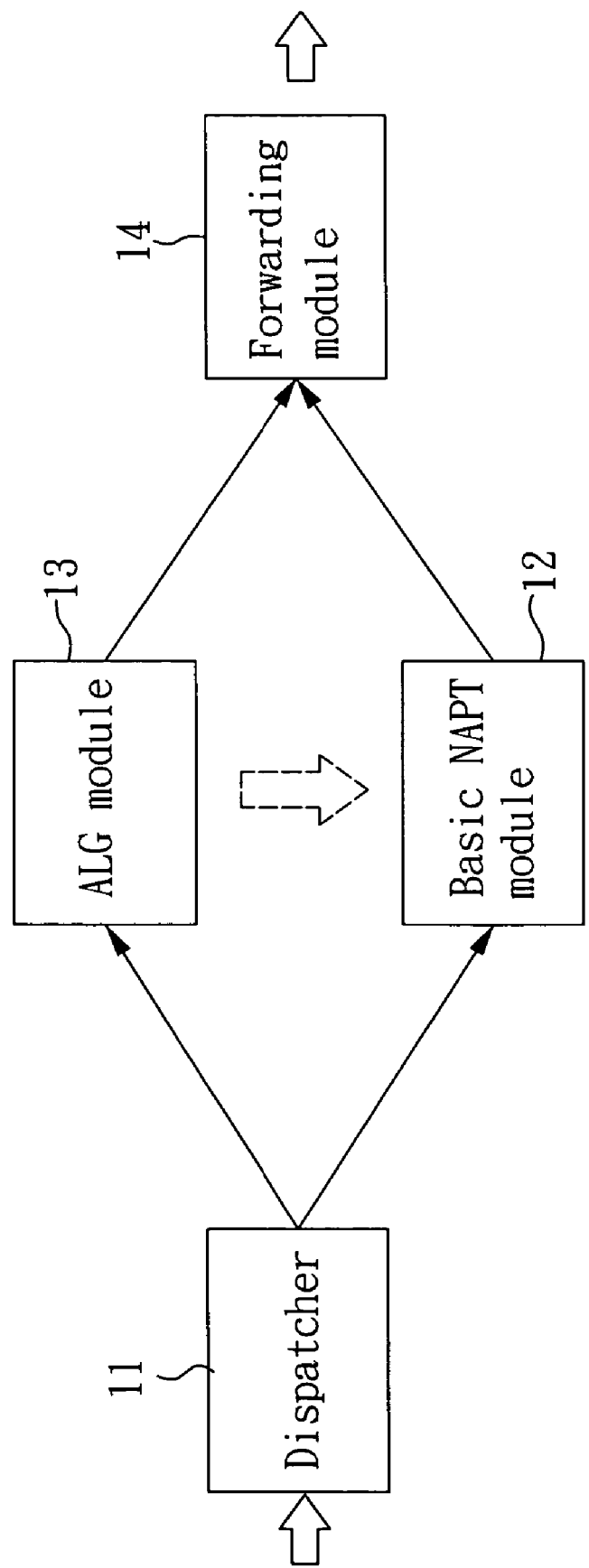
FIG. 1 shows a schematic diagram of essentially functional blocks of a Network Address & Port Translation system on chip (NAPT SoC)
Figure 2:
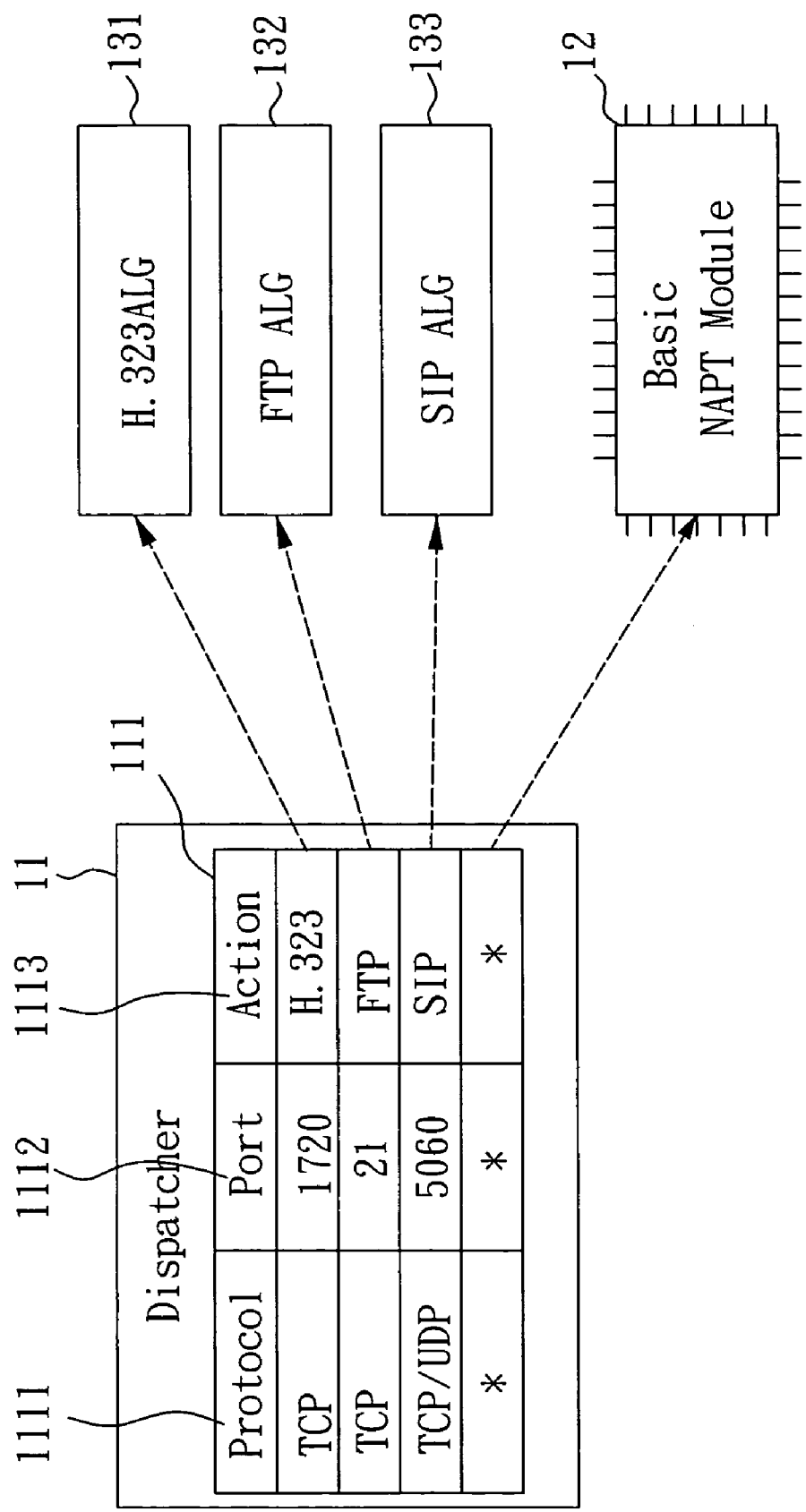
FIG. 2 shows a schematic diagram of packet dispatch from the typical dispatcher of FIG. 1.
Figure 3:
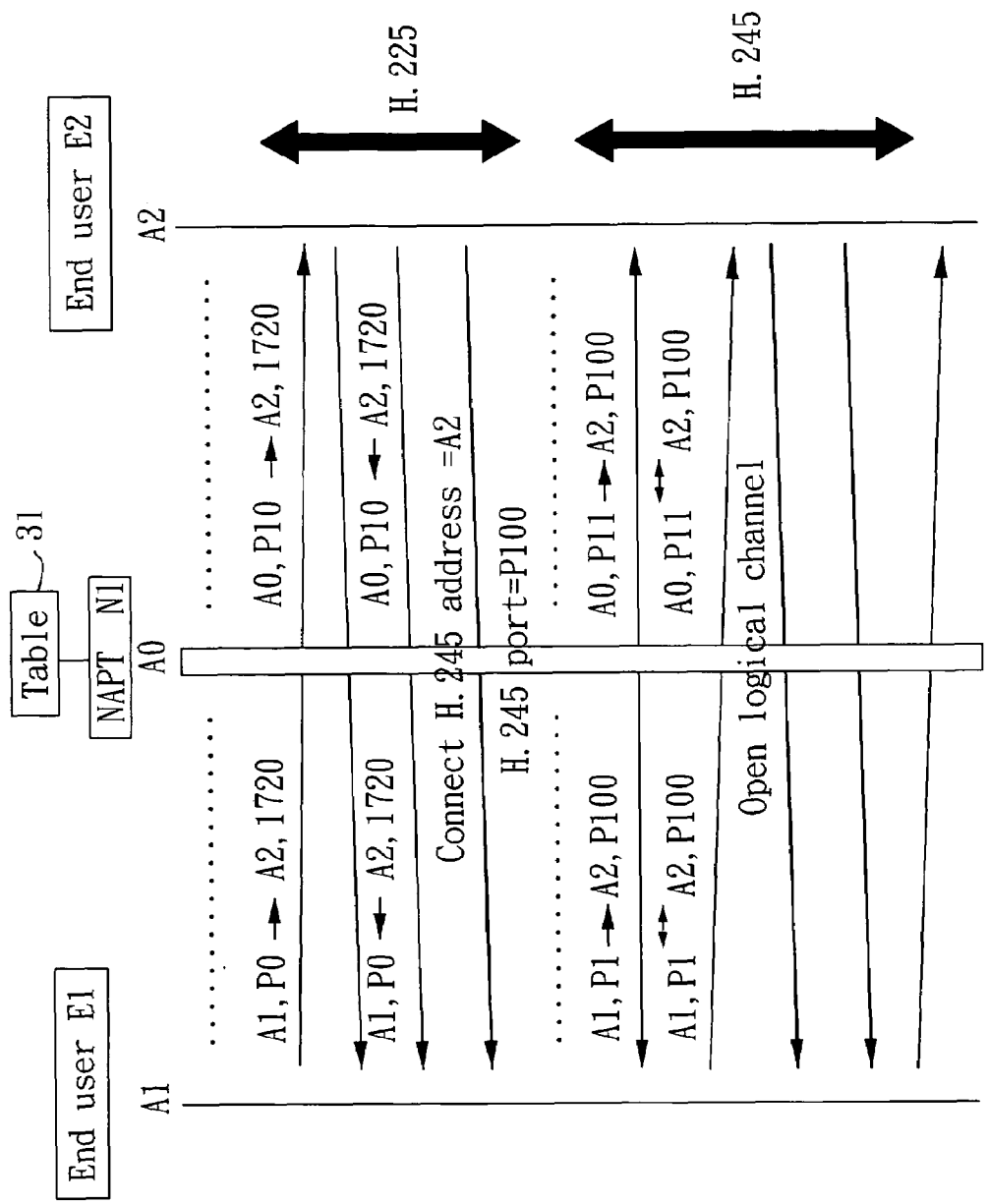
FIG. 3 is a flowchart of H.323 message interchange through the NAPT of FIG. 1.
Figure 4:
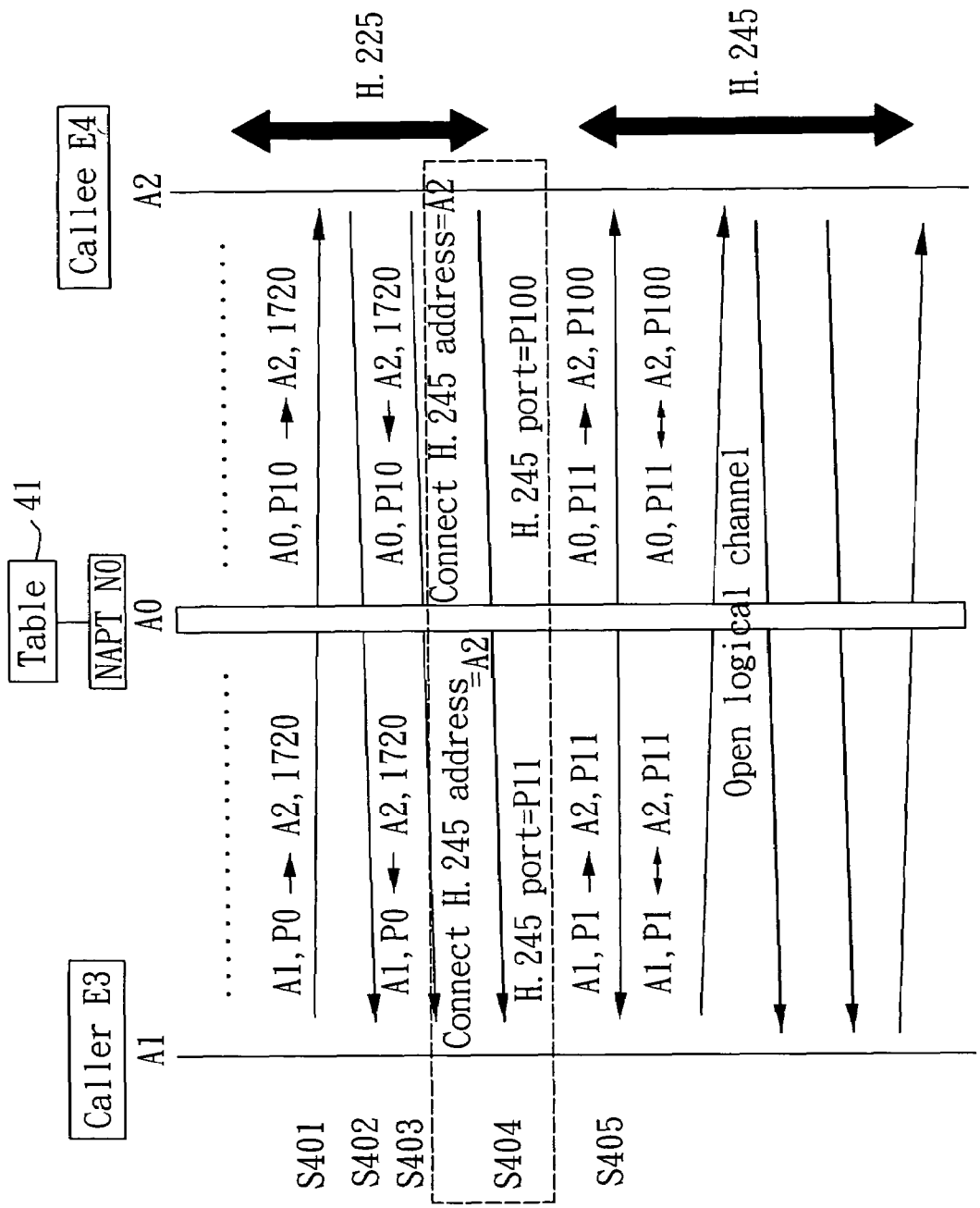
FIG. 4 is a message flowchart of a method for rapidly dispatching H.323 packets according to the invention.

FIG. 4 shows a message flowchart in accordance with a preferred embodiment of the invention. As shown in FIG. 4, a caller E3 proceeds a connection to a callee E4 through an NAPT N0 which is a translator. An internal configuration of the translator N0 can also refer to functional blocks shown in FIG. 1.

The inventive method is implemented essentially by the translator N0, and is executed after H.225 connection and before multimedia data delivery, such as delivering RTP/RTCP and the like. The method for rapidly dispatching H.323 packets through the translator N0 is described below with reference to the message flowchart of FIG. 4.

First, the caller E3 sends an H.225 connection packet to the callee E4 for establishing a connection (step S401). The H.225 connection packet is originated from a source of virtual network address A1 representing the caller E3 and port number P0 provided by the caller E3. The H.225 connection packet first passes through the translator N0 and then is forwarded to a destination of virtual network address A2 representing the caller E4 and port number 1720 provided by the callee E4. The translator N0 changes the virtual network address A1 belong to the caller E3 into a public network address A0 owned by the translator N0 and the port number P0 provided by the caller E3 into a port number P10 selected by the translator N0. Thus, a translated H.225 connection packet is formed. After the translator N0 stores corresponding translated data in a look up table 41, the translator N0 forwards the translated H.225 connection packet to the callee E4.

Because the cited destination for the H.225 connection packet has a constant connection port number 1720, the look up table in the dispatcher of the translator N0 can create a mapping relation of the connection port number to the H.323 ALG module. Accordingly, when the translator N0 receives the cited packet, the cited packet can quickly be dispatched to the H.323 ALG module according to the TCP and the connection port number 1720 for packet processing. The connection control message packet is subsequently forwarded to the callee E4.

In step S402, the callee E4 responds the port number P10 of the translator N0 with its network address A2 and port number 1720. After the translator N0 receives packet having the port number 1720, the packet is sent to the H.323 ALG module to process in accordance with the packet's TCP and port number 1720. The packet after being processed is sent to the callee E3 having the network address A1 and port number P0.

In step S403, the callee E4 sends an Alerting message. In step S404, the callee E4 issues a 'Connect' control message packet to the caller E3. The 'Connect' control message packet has the network address A2 belong to the callee E4 and a connection port number P100 to be used by the H.245 protocol. The 'Connect' control message packet is forwarded to the caller E3 through the translator N0.

After the translator N0 receives the 'Connect' control message packet, it changes the connection port number P100 included in the H.225 'Connect' control message packet to a selected unique connection port number such as P11. The translator N0 records the original connection port number P100 and the changed connection port number P11 to thus create an index relation and stores associated H.245 connection message sent by the callee E4 in a corresponding position of the connection port number P11. The H.225 'Connect' control message packet is subsequently forwarded to the caller E3.

In step S405, the caller E3 sends an H.245 connection packet to the connection port number P11 of the callee E4 at the network address A2 according to address port data included in the H.225 (Connect) connection control message packet received. The H.245 connection packet has network address A1 representing the caller E3 and connection port number P1 provided by the caller E3. A connection packet sent by the caller E3 first passes through the translator N0 and is forwarded to the callee E4.

The translator N0 receives the H.245 connection packet sent by the caller E3 and determines to apply the internal H.323 ALG module to process the packet according to destination port number P11 included in the packet. Therefore, the translator N0 can directly extract corresponding H.245 connection message of the callee E4 at related position indicated by the port number P11 in view of the aforementioned index relation and accordingly dispatch the connection packet to the H.323 ALG module to process for changing source address, destination address, source connection port number and destination connection port number included in the packet. As cited, source address and source connection port number are changed into network address A0 representing the translator N0 and connection port number P11 selected by the translator N0 respectively. Destination address and destination connection port number are changed into network address A2 representing the callee E4 and connection port number P100 provided by the callee E4 respectively. Thus, a changed connection packet is generated. Subsequently, the translator N0 applies an internal forwarding module (FIG. 1) to forward the changed connection packet to the callee E4 to complete H.245 control connection establishment.

Subsequently, negotiation of physical connection data for multimedia data transmission between the caller E3 and the callee E4 is proceeded over the H.245 connection established. Connection messages are exchanged through port number P11 provided by the translator N0. Namely, the caller E3 sends connection packets directly to port number P11 of the callee E4 as well as the callee E4 sends connection packets to port number P11 of the translator N0. The caller E3 is communicated with the callee E4 via the translator N0. Therefore, subsequent H.245 message packets are forwarded through the translator N0 and connection port number P11, such that when the translator N0 receives H.245 packets, transmission data at associated position can be directly and quickly taken only from connection port number P11 (i.e., of the callee E4 or the translator N0) by indexing, thereby increasing packet dispatching rate to the H.323 ALG module.

The translator N0 can apply connection port number P11 as a memory direct addressing index value to add or delete because it is included in associated H.245 connection message of the callee E4 that is stored in position (memory) relative to the connection port number P11 pre-taken, so as to relatively reduce maintenance cost for the aforementioned front-end table stored in the dispatcher. Further, when searching, the connection port number P11 can be regarded as an index value directly referring to memory address for direct and quick comparison and thus effectively increase H.323 packet dispatching rate.

Although the present invention has been explained in relation to its preferred embodiment, it is to be understood that many other possible modifications and variations can be made without departing from the spirit and scope of the invention as hereinafter claimed.

What is claimed is:

1. A method for rapidly dispatching H.323 packets, implemented in a network address and port translation (NAPT) with a first network address, comprising:

an H.225 message packet receiving step, which uses the NAPT to receive an H.225 connect message packet sent by a second termination, the H.225 connect message packet including a data content having a first connection port number for an H.245 connection;

a connection port number changing step, which uses the NAPT to select a second connection port number to replace the first connection port number of the H.225 connect message packet and thus generate a changed message packet for a first termination;

an H.245 connection packet receiving step, which uses the NAPT to receive an H.245 connection packet sent by the first termination, the H.245 connection packet including a source content having both a third connection port number and a second network address and a destination content having both the second connection port number and a third network address;

a connection port number changing step, which uses the NAPT to change the third connection port number by means of the second connection port number for generating a changed H.245 connection packet, record the second and third connection port numbers for producing an index relation, and send the changed H.245 connection packet to the second termination;

an H.245 connection responding step, which uses the second termination to send a response packet to the second connection port number of the NAPT in accordance with the changed H.245 connection packet, the response packet including a source content having both the third network address and the first connection port number;

a packet translation forwarding step, which uses the NAPT to forward the response packet to the first termination based on the index relation and translate firstly the first connection port number in the source content of the response packet into the second connection port number, then the first network address and the first connection port number into the first termination's second network address and the third connection port number and finally the response packet into the third connection port number of the first termination; and a connection message exchanging step, which exchanges packets between the first termination and the second termination through the NAPT and the second connection port number.

2. The method as claimed in claim 1, wherein in the H.245 connection port number changing step, the second connection port number is an unique port number selected by the NAPT.

3. The method as claimed in claim 1, wherein the H.245 connection port number changing step is performed by an H.323 application layer gateway (ALG) unit included in the NAPT which also has a dispatcher.

4. The method as claimed in claim 3, wherein in the connection message exchanging step, when the first termination sends at least one first connection message packet to the second connection port number of the second termination and the second termination sends at least one second connection message packet to the second connection port number of the NAPT, the dispatcher receives the connection message packets and directly dispatches the connection message packets to the H.323 ALG unit in accordance with the index relation between the second and third connection port numbers, thereby increasing packet dispatching rate.

5. The method as claimed in claim 1, wherein the second connection port number is a memory direct addressing index value for direct comparison to a memory when searching, thereby increasing H.323 packet dispatching rate.

6. A method for rapidly dispatching H.323 packets, implemented in a network address and port translation (NAPT) with a first network address, comprising the steps of:

a H.225 message packet receiving step, which uses the NAPT to receive an H.225 connect message packet sent by a second termination, the H.225 connect message packet including a data content having a first connection port number for an H.245 connection; and a connection port changing step, which uses the NAPT to select a second connection port number to replace the first connection port number of the H.225 connect message packet and thus generate a changed message packet for a first termination, in order to translate corresponding packet address and connection port number through the second connection port number and the NAPT in subsequent H.245 connection protocol and connection message exchange, thereby rapidly dispatching H.323 packets.

7. The method as claimed in claim 6, wherein the second connection port number is an unique port number selected by the NAPT.

8. The method as claimed in claim 6, wherein the H.245 connection protocol includes:

an H.245 connection packet receiving step, which uses the NAPT to receive an H.245 connection packet sent by the first termination, the H.245 connection packet including a source content having both a third connection port number and a second network address and a destination content having both the second connection port number and a third network address;

a connection port number changing step, which uses the NAPT to change the third connection port number by means of the second connection port number for generating a changed H.245 connection packet, record the second and third connection port numbers for producing an index relation, and send the changed H.245 connection packet to the second termination;

an H.245 connection responding step, which uses the second termination to send a response packet to the second connection port number of the NAPT in accordance with the changed H.245 connection packet, the response packet including a source content having both the third network address and the first connection port number; and a packet translation forwarding step, which uses the NAPT to forward the response packet to the first termination based on the index relation and translate firstly the first connection port number in the source content of the response packet into the second connection port number, then the first network address and the first connection port number into the first termination's second network address and the third connection port number and finally the response packet into the third connection port number of the first termination.

9. The method as claimed in claim 6, wherein the connection message exchange is performed between the first and second termination via the NAPT and the second connection port number.

10. The method as claimed in claim 8, wherein the H.245 connection port number changing step is performed by an H.323 application layer gateway (ALG) unit included in the NAPT which also has a dispatcher to directly dispatch connection packets to the H.323 ALG unit in accordance with the index relation between the second and third connection port numbers.

11. The method as claimed in claim 6, wherein the second connection port number is a memory direct addressing index value for direct comparison to a memory when searching, thereby increasing H.323 packet dispatching rate.

* * * * *